US008875261B2

(12) United States Patent  
Delia et al.

(10) Patent No.: US 8,875,261 B2
(45) Date of Patent: Oct. 28, 2014

(54) RULES DRIVEN MULTIPLE PASSWORDS

(75) Inventors: Wayne M. Delia, Poughkeepsie, NY (US); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1459 days.

(21) Appl. No.: 12/256,129

(22) Filed: Oct. 22, 2008

(65) Prior Publication Data

US 2010/0100948 A1     Apr. 22, 2010

(51) Int. Cl.
*G06F 15/16* (2006.01)
*G06F 12/14* (2006.01)
*G06F 21/31* (2013.01)

(52) U.S. Cl.
CPC .................................. *G06F 21/31* (2013.01)
USPC ................................. 726/6; 726/24

(58) Field of Classification Search
CPC ..... G06F 21/31; G06F 21/577; H04L 63/083; H04L 63/08; H04L 63/102; H04L 63/0815; H04L 9/32; H04L 63/0861; H04L 63/1433; H04L 63/1416; H04L 63/20; H04L 63/1408
USPC .................. 726/1, 6, 16, 17, 4, 24, 25, 26, 27
See application file for complete search history.

(56) References Cited

U.S. PATENT DOCUMENTS

| | | | | |
|---|---|---|---|---|
| 5,721,780 A * | 2/1998 | Ensor et al. | ..................... | 713/155 |
| 5,812,764 A * | 9/1998 | Heinz, Sr. | .......................... | 726/5 |
| 6,073,176 A | 6/2000 | Baindur et al. | | |
| 6,799,277 B2 | 9/2004 | Colvin | | |
| 6,802,000 B1 * | 10/2004 | Greene et al. | ................. | 713/168 |
| 6,883,099 B2 | 4/2005 | Terrell et al. | | |
| 7,571,483 B1 * | 8/2009 | Bascle et al. | ..................... | 726/24 |
| 7,716,109 B1 * | 5/2010 | Jacobs et al. | ..................... | 705/37 |
| 2003/0131266 A1 * | 7/2003 | Best et al. | ...................... | 713/202 |
| 2004/0187023 A1 * | 9/2004 | Alagna et al. | ................... | 713/200 |
| 2005/0114673 A1 * | 5/2005 | Raikar et al. | ................... | 713/182 |
| 2005/0216768 A1 * | 9/2005 | Eppert | ........................... | 713/201 |
| 2006/0259960 A1 * | 11/2006 | Kondo | ................................ | 726/6 |
| 2006/0288229 A1 * | 12/2006 | Hamid et al. | ................. | 713/182 |
| 2007/0039042 A1 * | 2/2007 | Apelbaum | ........................ | 726/6 |
| 2007/0162597 A1 * | 7/2007 | Tanaka et al. | ................. | 709/224 |
| 2007/0203685 A1 * | 8/2007 | Takano | ........................... | 703/23 |
| 2007/0277230 A1 * | 11/2007 | Hawkins et al. | ................. | 726/4 |
| 2008/0221885 A1 * | 9/2008 | Lin | .............................. | 704/246 |
| 2008/0276308 A1 * | 11/2008 | Graser et al. | ..................... | 726/6 |
| 2009/0097459 A1 * | 4/2009 | Jendbro et al. | ................. | 370/338 |
| 2009/0125522 A1 * | 5/2009 | Kodama et al. | ................... | 707/9 |

OTHER PUBLICATIONS

"A Large-Scale Study of Web Password Habits" by Dinei Florencio, et al., Microsoft Research, One Microsoft Way, Redmond, WA, USA.
"Modeling Network Intrusion Detection Alerts for Correlation" by Zhou, University of CA, Davis, Heckman, et al. Promia, Inc. & Carlson, et al. University of CA, Davis.

* cited by examiner

*Primary Examiner* — Abu Sholeman
(74) *Attorney, Agent, or Firm* — John A. Jordan

(57) ABSTRACT

A rules driven multiple passwords system is provided wherein a list of stored passwords are used in rotation over time in accordance with a set of rules or conditions managed by the system. With such an arrangement, the currently active password of a system User may automatically be changed, in accordance with the rules or conditions, to the next password in the list. The User is notified as to the newly assigned password.

7 Claims, 5 Drawing Sheets

| SEQUENCE | ACCOUNT | TEMP PASSWORD |
|---|---|---|
| 1 | db2inst3 | temp1234 |

FIG. 3

| SEQUENCE | ACCOUNT | PASSWORD | TIME LIMIT |
|---|---|---|---|
| 1 | db2inst3 | alpha123 | 30 DAYS |
| 2 | db2inst3 | beta2468 | DEFAULT |
| 3 | db2inst3 | gamma357 | 45 DAYS |
| 4 | db2inst3 | delta789 | 15 DAYS |
| 5 | db2inst3 | epsilon8 | 30 DAYS |

FIG. 4

RULES DRIVEN MULTIPLE PASSWORDS

BACKGROUND OF THE INVENTION

1. Field of the Invention

The present invention relates to password authentication systems and, more particularly, to password authentication systems and methods as may be used to gain access to protected, secured systems.

2. Background and Related Art

Passwords play a large part of typical secured system users experience and are one of the most common means for gaining access to a wide variety of user accounts. For example, E-mail, banks, postals, commercial and various corporate and government networking sites all require passwords.

Typical password authentication systems employ a single password corresponding to a computer-based account. Such systems generally rely on a static history of the previous few passwords used for the account where the system requirement prohibits the reuse of a password within some specified past number of iterations. Such history of previous passwords may also be used to compare the difference between a proposed new password and previous passwords. Where the difference between a proposed new password and previous passwords maintained in the history does not meet some established criteria, the proposed password will be rejected by the system.

In addition, other password rules may be employed by such system. For example, the length of the password string of characters and type of characters employed may be specified. In addition, rules as to the order of characters employed and their position in the string may be specified. Alternatives to password access to systems do exist but are more time consuming, costly and difficult for the user.

Thus, although passwords are the generally accepted approach for user access to networks, accounts and the like, their use can be difficult because of the various rules governing their creation. However, since passwords protect accounts with valuable assets, they have increasingly been subject to attacks by various schemes.

The problems of password access to user accounts, and the like, is made more difficult by the large role passwords play in user lives. It has been found that the average web user has 6.5 passwords, each of which is shared across approximately 4 different sites. Moreover, it has been found that each user has about 25 accounts that require passwords, and types an average of 8 passwords per day.

Accordingly, there is a need for password authentication systems that offer higher security, and yet are less difficult and cumbersome to use by the users. For example, if users are required to obtain and remember a new password every one to three moths for multiple accounts, users are then inclined to use the same weak passwords over several of the accounts.

SUMMARY OF THE PRESENT INVENTION

In accordance with the present invention, a rules driven multiple passwords system is provided wherein a stack or list of stored passwords may be created upon a single user access according to the rules governing creation, and then such created passwords may be used in rotation over time. With such an arrangement, the currently active password of a system user may automatically be changed under various defined rules or conditions to the next password in the stack. Notification to the user may be given when the password is changed by the system.

The depth of the stack may be varied but, generally, would be sufficiently large to overcome system operating rules on reusing previously employed passwords. One condition for automatically changing a password to a new one in the stack would occur when a password expires according to default operating system rules that require, for example, resetting a password after it has been used for 60 days. Other, alternative, arrangements using the password stack may be employed.

Embodiments of the present invention are generally directed to methods and apparatus for providing a list of stored passwords and rules based upon conditions for changing the password when one or more of the conditions occur.

In accordance with one aspect of the invention, a method comprises: providing a list of passwords to be associated with a user account; providing a set of conditions for automatically changing the password currently being used for the user account; monitoring the conditions of the user account to determine when one or more of the conditions occur; and automatically selecting a new password from the list of passwords when one or more of the conditions occur.

In further aspects of the above invention, the method wherein:
- each of the passwords of the list of passwords expires after some predetermined period of time;
- the passwords of the list of passwords are selected in sequence from the list; and
- the list is long enough to allow selection of passwords with a total expiration time sufficient to allow reuse of passwords selected earlier in the sequence.

In accordance with another aspect of the invention a method of password management in a user-accessible system comprises: storing a list of passwords to form a password stack; providing a set of conditions for a password change to a new password from the current password being used by a user; monitoring the conditions to determine when one or more of the conditions occur; and selecting a new password from the password stack when one or more of the conditions occur.

In further aspects of the method of password management in a user-accessible system, wherein:
- the password list is sufficiently long so as to avoid system rules on reusing previous passwords within some specified period of time;
- a temporary single password is initially assigned to a new user;
- the temporary password allow the new user to create a list of passwords for the password stack to be stored;
- the new user specifies the time limits to expiration for passwords in the password stack; and
- a new password is automatically assigned to a user from the password stack when a virus is detected.

In accordance with a further aspects of the invention, a computer implemented method for user account authentication by: providing a stored list of passwords to be associated with access to a user account; providing a set of conditions under which the password currently being used for access to the user account is changed; monitoring the conditions of the user account to determine when one or more of the conditions occur; and providing the user account with a new password from the list of passwords when one or more of the conditions occur.

In accordance with yet another aspect of the invention, a computer system for controlling access to user accounts, comprising: storage apparatus for storing a list of stored passwords for a user account; storage apparatus for storing a set of conditions for assigning a new password to the user account; and a processor for monitoring the user account to determine when one or more of the conditions occur and act to provide a new password for the user account when one or more of the conditions are determined.

In accordance with yet a further aspect of the invention, a program storage devices readable by a machine, tangibly embodying a program of instructions executable by a machine to perform the method steps for password management, the method comprising the steps of: providing for a list of passwords to be stored to form a password stack; providing for a set of operative conditions for a password change to a new password from the current password being used by a user; providing for the conditions to be monitored to determine when one or more of the conditions occur; and providing for selection of a new password from the password stack when one or more of the conditions occur.

BRIEF DESCRIPTION OF THE DRAWING

FIG. 3 shows a table depicting the assignment of a temporary password to an account.

FIG. 4 shows a table depicting an example of a sequence of selected passwords that may be automatically assigned under some possible conditions for a password change.

DETAILED DESCRIPTION OF THE DRAWINGS

Figure 1:
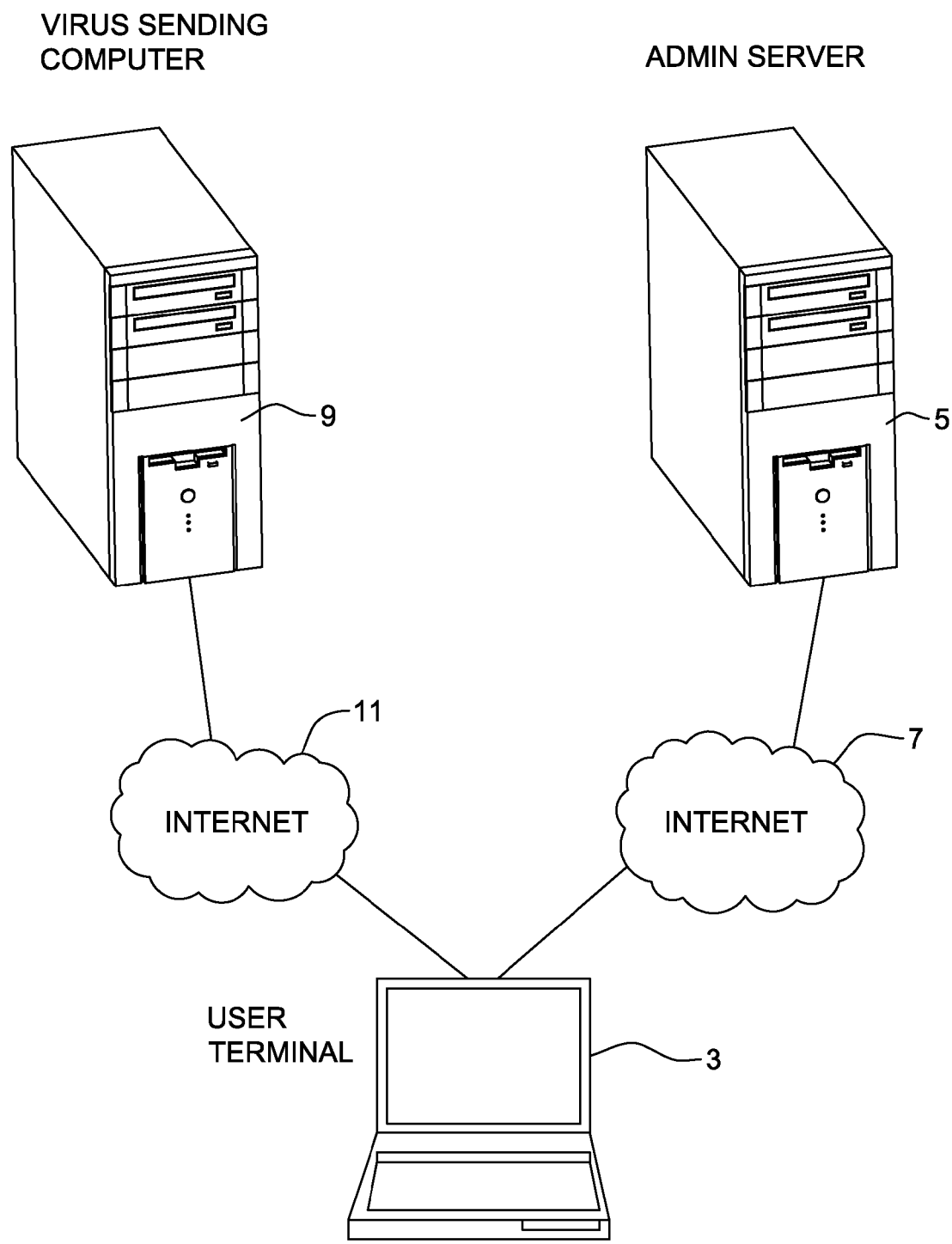
FIG. 1 shows a typical internet system configuration

With reference to FIG. 1, there is shown a system arrangement wherein a User Terminal 3 interconnects to an administrative Server 5. User Terminal 3 may be any of a variety of user terminals, preferable with graphical user input capability. User Terminal 3 may be, for example, a laptop or personal computer. Although the User Terminal 3 is shown as corrected by internet 7 interconnection, it is clear that the interconnection could, as well, be a private network, such as, a corporate, business or educational network arrangement, or a local area network.

Also depicted in FIG. 1 is Computer 9, shown as a possible source of virus. Computer 9 is also shown connected to the internet over internet connection 11 to User Terminal 3. Computer 9 may be any type of computer connected to the internet capable of being the source of a virus.

Figure 2:
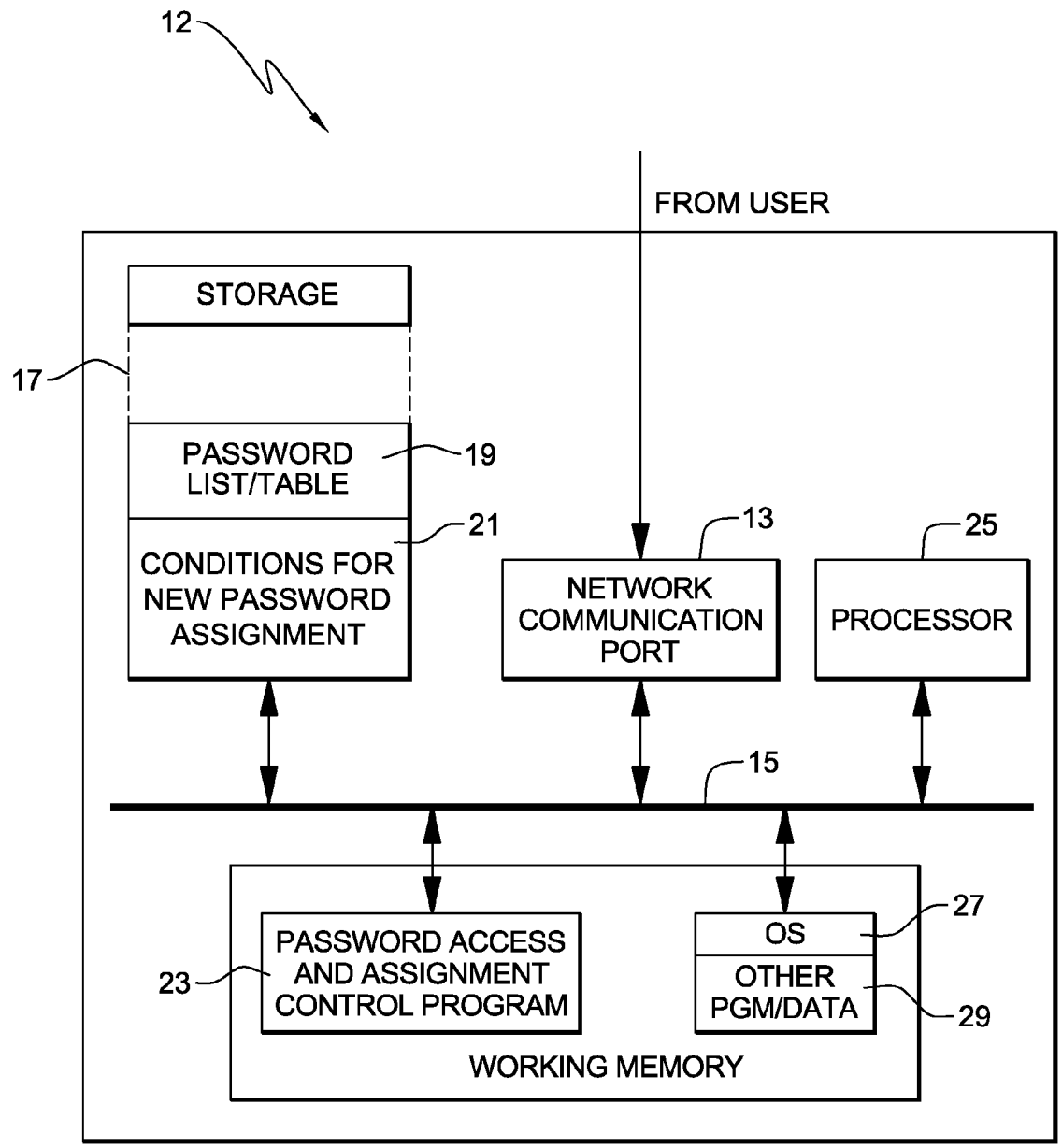
FIG. 2 illustrates a system arrangement for implementing user password authentication, in accordance with the present invention.

FIG. 2 shows a block diagram of a possible system hardware arrangement 12, as may be employed to implement the password authentication process, in accordance with one embodiment of the present invention. The system arrangement 12 shown in FIG. 2 would typically be at least a portion of administrative Server 5 of FIG. 1. In this regard, Server 5 could be a plurality of computers linked together.

FIG. 2 further shows a Network Communications Port 13 through which user access is linked to system Bus 15. The Communications Port typically includes apparatus, such as a modem or network card, for receiving both wired and wireless communication.

System 12 of FIG. 2 also includes Storage Device 17 which may comprise any of a variety of storage devices, such as, disk drives, optical storage devices, solid state storage devices, and the like. The Storage Device 17 includes a storage area 19 for storing the Passwords List/Table, i.e., the stack or list of passwords, as employed in accordance with the present invention. As used herein the term "stack" of passwords, "password stack", "list" of passwords, "table" of passwords, "Password List/Table" and "Table" are used interchangeably throughout the description of the invention and are intended to mean the same thing.

The "stack", "list" or "table" of passwords may be of any desired length but it is clear that it would be advantageous to have a list sufficiently long such that earlier used passwords of the list could be reused without violating operating system rules which prohibit reuse of a specific password (or one close to a specific password) within some specified period of time.

It is to be understood that the passwords in the Password List/Table may be automatically selected in the order in which they appear in the list or in any predetermined or prescribed order which order may be the same over successive cycles or altered according to some pattern. Again, the order in which passwords are selected may be random as long as the random choice does not act to select passwords that violate operating system rules on reuse within some specified period of time.

Storage device 17 of FIG. 2 may also include an area 21 for storing at least some of the Conditions For New Password Assignment. Such conditions may be any of a variety of conditions such as may be necessary for appropriate security of the system and ease of use. For example, a new password may be selected by the process of the present invention when an incorrect password has been entered in the User account three times in a row. Such could suggest that the user has forgotten the currently used password and the system automatically selects a new password and notifies the user that a new password from the list has been assigned. In addition, the process of the present invention may also notify the user that the password assigned is the $n^{th}$ password in the sequence without identifying the password itself.

As further shown in FIG. 2, Working Memory, connected to Bus 15, includes an area 23 for storing a Password Access and Assignment Control Program for controlling password operations, such as password creation, selection, access and assignment. Processor 25 acts, through Operating System (OS) 27, to carry out the operation of Password Control Program 23. "OTHER PGM/DATA" shown in Working Memory may include OS Rules for Password Control or the like.

With reference to FIG. 3, there is shown a table for providing a user account, that may be designated "db2inst3," a temporary password, that may be designated "temp 1234". This password may be issued by the System Administrator to a newly-created specific User ID when an account is opened. This provides the user access to the system so the user can create a list of passwords to be used for specified periods of time in some designated sequence. The designated sequence may be in the order in which the passwords are created in the list or any other designated order as selected by either the user or the system.

FIG. 4 shows a list or table of arbitrarily chosen passwords, given by way of example to demonstrate some possible conditions for automatically assigning a new password from the list. The passwords may be created by the owner of the User ID receiving the temporary password through a graphical user interface or a command line prompt. Any updating of password may be done in the same manner.

As shown in FIG. 4, different password expiration time limits may be selected for each of the passwords on the password list. Thus, the sequence 1-5 shows automatic new password selection and assignments to the user after 30 days, then upon default, and then after 45, 15 and 30 days if selected in the order in which they appear in the list or table. The default password selection and assignment to the user may be for any of a variety of reasons, such as, in response to operating system rules, and the like.

It can be seen that where, for example operating system rules permit reuse of a password after 90 days, then password "alpha 1234" may be reused. In this regard, the Password Access and Assignment Control Program and/or Operating System could be designed to automatically reuse the "alpha 1234" password, for example, by removing it from its current position in the list and adding it to the bottom of the list. It is clear that any of a variety of schemes may be designed for assigning and reassigning passwords to the operating list of passwords. As previously mentioned, it is also clear that a separate historical record may be maintained by the system tracking which passwords have already been assigned.

There may be any number of conditions for automatically assigning new passwords from the password list to a User account. The following are given by way of some possibilities:

When a password expires according to the default operating system rules.
When a password expires according to the optional override time limit in the password stack.
When the user decides to change a password.
When a system administrator intentionally resets the password.
When a password is incorrectly typed and subsequently the account is suspended.
When a virus is detected.

It is understood that the password currently employed by the User may be entered by the User each time the User accesses the secured system. Alternatively, the currently employed password may be stored such as to allow the User, on signing in, to access to secured system without the need to type the password. Where the latter is the mode of operation, any newly assigned password selected by the system could also be stored.

Figure 5:
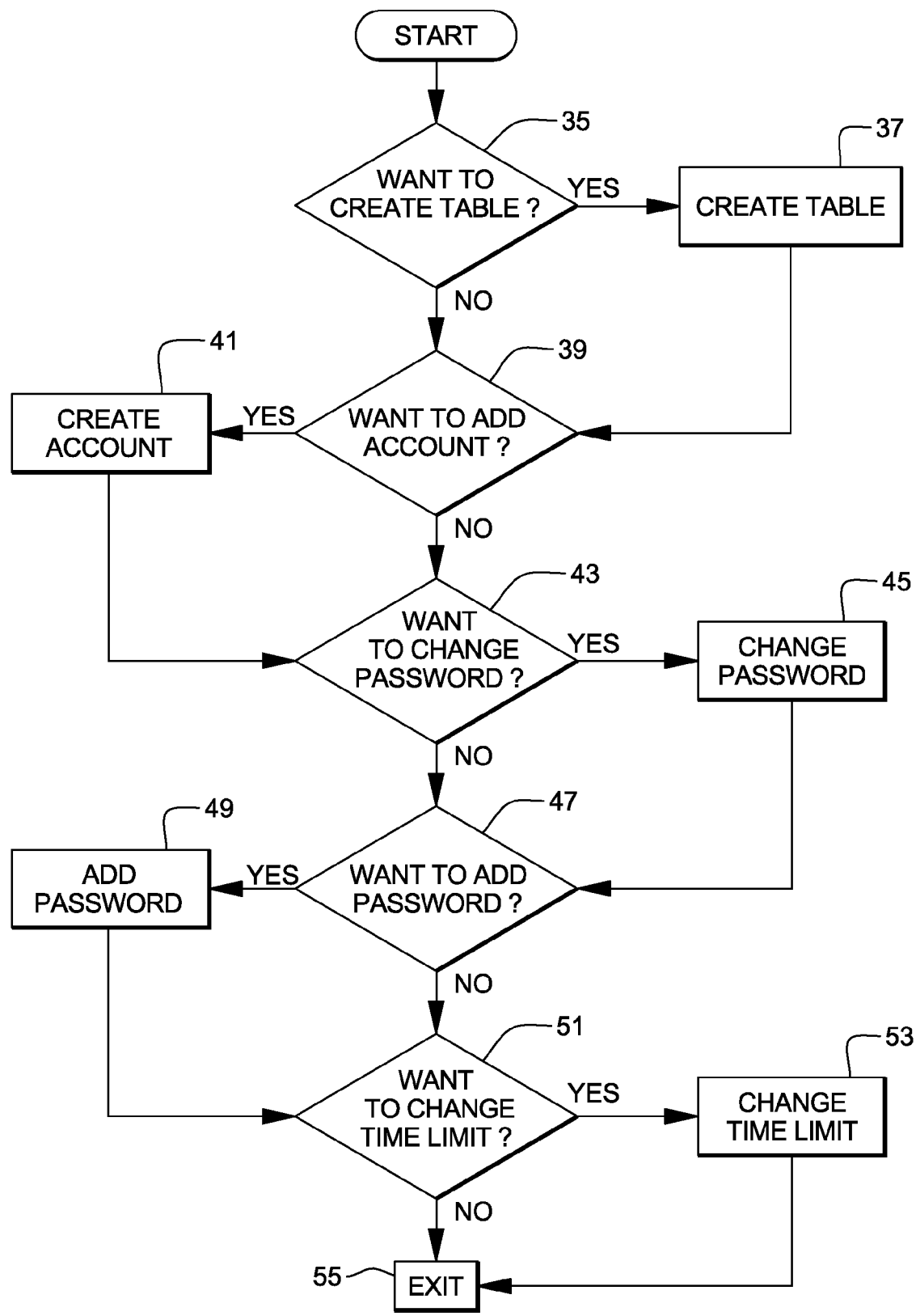
FIG. 5 shows a flow chart depicting steps of a process for creating a user account and password list or table.

With reference to FIG. 5, there is shown a process, in accordance with the present invention, for a User to create and update a password list or table, such as, Password List/Table 19 shown in FIG. 2. The process starts at Want To Create Table? step 35 wherein it is determined whether the User wants to create a password table. If the answer is "yes", an interactive process is invoked by Create Table step 37 whereby the User creates a password table.

If the password table created is created by a User of a new user account, the process moves to Want To Add Account? step 39 where it is determined whether the account is to be added to the system. If the User answer is "yes", the account is created in Create Account step 41. It is noted that decision step 39 is also entered into from the "no" output of step 35 where the User does not want to create a password table.

After an account is created at step 41 or the decision out of step 39 is "no", a determination is made at step 43 as to whether the User wants to change the currently used password. If the user answer is "yes", the account is selected and the password is changed by Change Password step 45.

Whether the password is changed or not, the process moves from step 43 to Want To Add Password? step 47 where it is determined whether the User wants to add a password. If the User answer is "yes", the account is selected and the password is added to the Password List/Table 19 (FIG. 2) stored in the system by Add Password step 49.

Regardless of whether a password is added to the Password List/Table 19 or not, the process moves to step 51 to determine whether the User wants to change the time limit of one or more passwords. If the answer is "yes" the process moves to Change Time Limit step 53 wherein the account is selected and the User is allowed to interactively change time limits in the passwords stored in Password List/Table 19. Whether time limits of passwords are changed or not, the process ends and exits at point 55.

Figure 6:
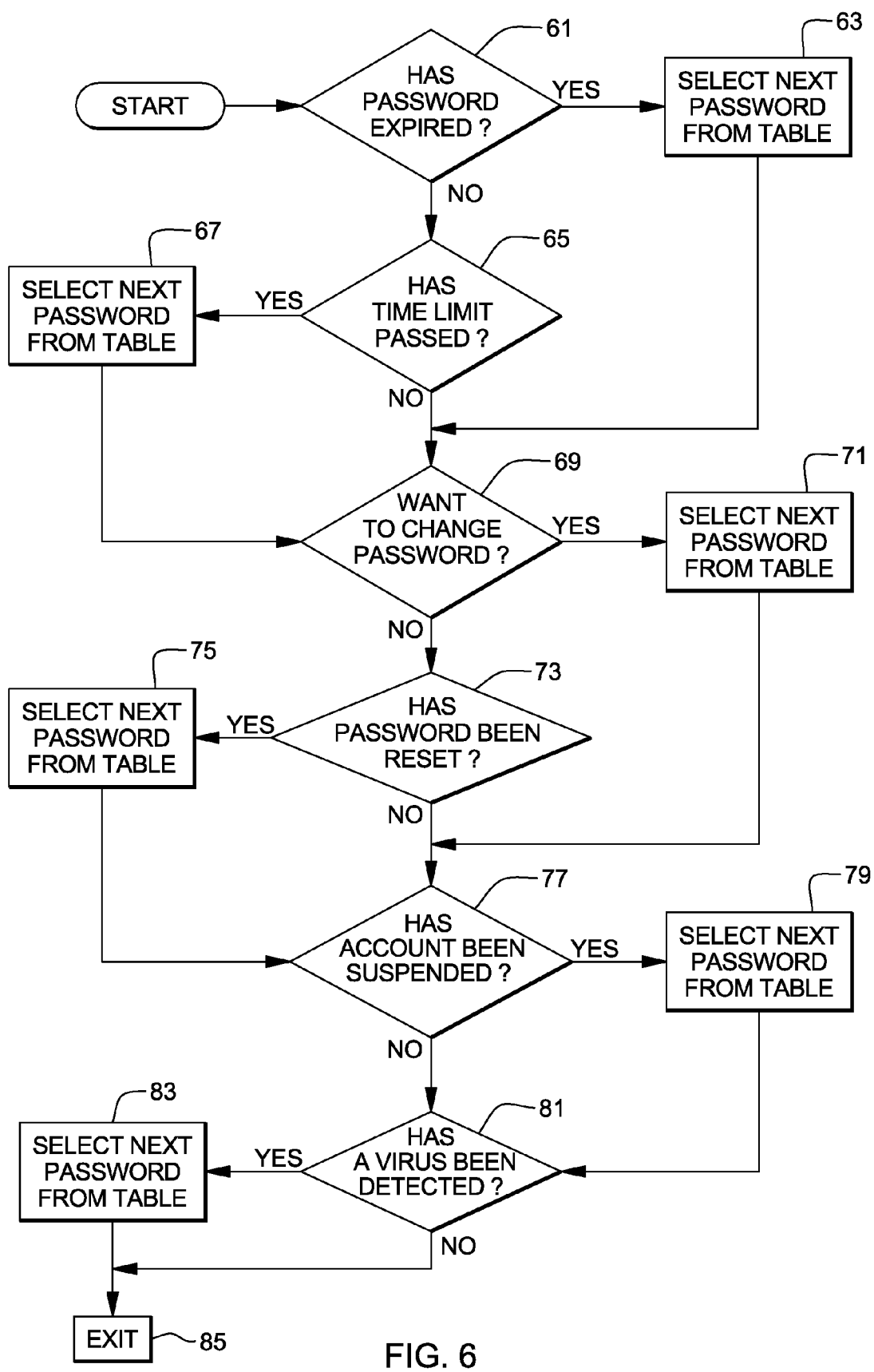
FIG. 6 shows a flow chart depicting the steps of a process for automatically changing a password.

FIG. 6 shows a process for automatically changing a password, as performed by the system to which the User Account has access. The process employs some of the possible conditions under which a new password may be automatically assigned to the User Account. It is clear that the process shown can readily be modified to include additional conditions under which a new password would automatically be selected and assigned to the User.

The process begins at the query of step 61 wherein a decision is made as to whether the password currently employed by the User Account has expired, according to the Operating System time limitations on password use. If it has, a process is invoked by the Operating System and Password Access and Assignment Control Program whereby a new password is selected from the password Table, as shown by the Select Next Password From Table step 63. Typically, this may be the next password from the currently employed password in the password Table, such as, Password List/Table 19 in FIG. 2. Thus, a sequential approach to password selection would be used in this instance whereby passwords are selected in the ordered sequence in which they are listed by the User. However, any algorithm may be used for the password selection process, such as, random selection of passwords from the password Table. The latter approach, as well as other approaches, may be associated with a record keeping process that maintains a history of passwords used from the password Table.

Where the password expiration check made by the Operating System of step 61 determines that the password has not expired, the Operating System determines whether the time limit of the currently employed passwords, as set by the User in the password Table, has expired. This process is carried out by Has Time Limit Passed? step 65 in FIG. 6.

If the time limit, as set by the User, for the currently employed password, has expired, a process is invoked by the Operating System and Password Access and Assignment Control Program whereby a new password is selected from the password Table, as shown by Select Next Password From Table step 67. After selection of a new password from the password Table, the process moves to the query of step 69.

At step 69, the on-line User may initiate a change in password. If the User initiates a change in password, the Select Next Password From Table Process is again invoked at step 71 whereby the Operating System and Password Access and Assignment Control Program act to select the next password in the password Table.

The overall process then goes to the Has Password Been Reset? condition of step 73. This step is carried out by the Operating System in response to the System Administrator intentionally resetting the password for any of a variety of reasons. Where the System Administrator acts to intentionally reset the User account password, the Select Next Password From Table process is again invoked at step 75 whereby the Operating System and Password Access and Assignment Control Program again act to select the next password in the password Table of the User Account and assign it to such account.

At step 77, the condition Has Account Been Suspended? is addressed. The suspension of a password may occur, for example, where a password is incorrectly typed by the User one or some preset number of times, such that the Operating System acts to automatically suspend the password. Where the User account has been suspended by the Operating System for whatever reason, the Select Next Password From Table process is again invoked at step 79 whereby the Operating System and Password Access and Assignment Control Program act to select the next password in the password Table.

The last condition of the process shown in FIG. 6 is addressed at step 81, although it is clear that the process could continue for a number of other conditions. At step 81, the Operating System, in monitoring activity of the Server, may detect a virus.

Thus, where a virus has been detected by the Operating System in accordance with the Has A Virus Been Detected? step 81, the Operating System acts to again invoke the Select Next Password From Table process at step 83 whereby the Operating System and Password Access and Assignment Control Program act to select the next password in the password Table. When the next password has been selected from the password Table or, alternatively, no virus is detected, the overall process exits at step 85.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer system for controlling access to user accounts comprising:
   storage apparatus for initially storing a single temporary password to a user account to allow said user account to create a preselected list of user account passwords with each password available for use by said user account and created according to any password creation rules of said computer system to form a password stack;
   storage apparatus for storing a list of user account created passwords to form said password stack with each password available for use by said user account and created by said user account according to said password creation rules of said computer system;
   storage apparatus for storing a set of conditions for automatically assigning a new password to said user account from said preselected list of user account created passwords of said password stack when conditions for assigning a new password occur, said set of conditions including specified time limits to expiration for each of said passwords in said password stack; and
   a processor for monitoring said user account to determine when said conditions occur and automatically act to assign a new password from said preselected list of user account created passwords of said password stack when said conditions occur including conditions for automatically assigning to said user account a new password from said password stack when a virus is detected.

2. The computer system of claim 1 wherein a new password from said preselected list of user account created and stored passwords is automatically assigned to said user account when the current password of said user account expires.

3. The computer system of claim 1 wherein a processor acts to allow the user of said user account to add passwords to said preselected list of user account created and stored passwords.

4. A method of password management in a user-accessible computer system, comprising:
   initially assigning a temporary single password to said user account to allow said user account to create a list of user account created passwords according to password creation rules to form a password stack;
   storing a list of user account created passwords to form said password stack with each password available for use by said user account and created by said user account according to said password creation rules of said computer system;
   storing a set of conditions for an automatic password change by said computer system to a new password from the current password being used by a user account with said new password taken from said password stack, said set of conditions including specified time limits to expiration for each of said passwords in said password stack;
   monitoring said conditions by said computer system to determine when said conditions occur;
   automatically selecting for use by said user account a new password from said preselected list of user account created passwords of said password stack by said computer system when said conditions occur; and
   automatically assigning a new password for use by said user account from said password stack when a virus is detected.

5. The method of password management of claim 4 wherein a new password is automatically assigned from said password stack for use by said user account after expiration of said specified time limits.

6. The method of password management of claim 5 wherein said list of passwords of said password stack is sufficiently long so as to avoid system rules on reusing previous passwords within some specified period of time.

7. The method of password management of claim 5 wherein a notice is sent to said user account when a new password is automatically assigned.

* * * * *